(12) United States Patent
Walkin et al.

(10) Patent No.: US 8,930,837 B2
(45) Date of Patent: Jan. 6, 2015

(54) GRAPHICAL USER INTERFACE FOR MAP SEARCH

(75) Inventors: Brandon Marshall Walkin, San Francisco, CA (US); Zhen Fang, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 126 days.

(21) Appl. No.: 13/113,889

(22) Filed: May 23, 2011

(65) Prior Publication Data

US 2012/0304087 A1 Nov. 29, 2012

(51) Int. Cl.
*G06F 3/048* (2013.01)
*G06F 17/30* (2006.01)

(52) U.S. Cl.
CPC ............................... *G06F 17/30241* (2013.01)
USPC ......................................... 715/764; 715/768

(58) Field of Classification Search
CPC ............................... G06F 3/048; G06F 3/0488
USPC .................................................. 715/764, 768
See application file for complete search history.

(56) References Cited

U.S. PATENT DOCUMENTS

| | | | |
|---|---|---|---|
| 2008/0070593 A1* | 3/2008 | Altman et al. | 455/457 |
| 2008/0104227 A1* | 5/2008 | Birnie et al. | 709/224 |
| 2011/0196926 A1* | 8/2011 | Crawford | 709/204 |
| 2011/0197200 A1* | 8/2011 | Huang et al. | 719/313 |
| 2012/0124508 A1* | 5/2012 | Morin et al. | 715/781 |

* cited by examiner

*Primary Examiner* — Andrea Leggett
(74) *Attorney, Agent, or Firm* — Baker Botts L.L.P.

(57) ABSTRACT

Particular embodiments include a method comprising accessing location data representing a first location of a first user wherein the first location corresponds to geographic coordinates, retrieving image data defining a graphical map from a remote server based on the first location accessing a search query inputted by the first user, retrieving one or more second locations in response to the search query, where the one or more second locations correspond to geographic coordinates, and displaying a first view comprising a list of the one or more second locations overlaying at least a portion of the graphical map, wherein the graphical map includes indicators for the first location and at least one of the one or more second locations in accordance with their respective geographic coordinates.

18 Claims, 9 Drawing Sheets

GRAPHICAL USER INTERFACE FOR MAP SEARCH

TECHNICAL FIELD

The present disclosure generally relates to location-based services, and more specifically relates to graphical user interfaces for map search with respect to location-based services.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. A social networking system, such as a social networking website, enables its users to interact with it and with each other through the system.

The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system. The maps graphical user interface can allow the user to obtain location data using a map search with respect to the geo-social networking system.

SUMMARY

The present disclosure generally relates to a location-based services network system, and more specifically relates to graphical user interfaces for map search with respect to the location-based services network system.

In particular embodiments, a computing device accesses location data representing a first location of a first user wherein the first location corresponds to geographic coordinates, retrieves image data defining a graphical map from a remote server based on the first location, accesses a search query inputted by the first user, retrieves one or more second locations in response to the search query, where the one or more second locations correspond to geographic coordinates, and displays a first view comprising a list of the one or more second locations overlaying at least a portion of the graphical map, wherein the graphical map includes indicators for the first location and at least one of the one or more second locations in accordance with their respective geographic coordinates.

These and other features, aspects, and advantages of the disclosure are described in more detail below in the detailed description and in conjunction with the following figures.

DESCRIPTION OF EXAMPLE EMBODIMENTS

Figure 1:
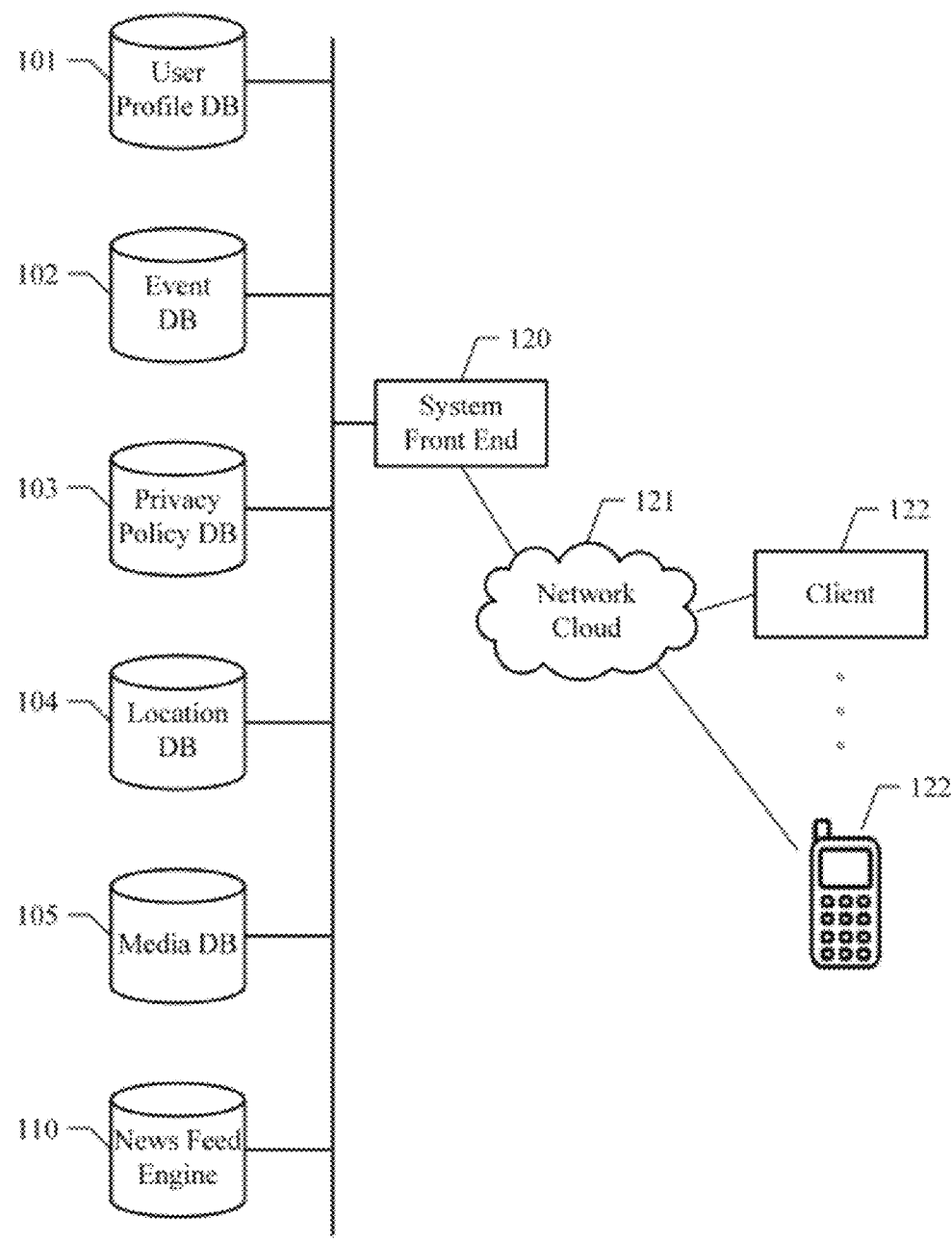
FIG. 1 illustrates an example social network system.

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages--typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars, search, events, and location-based services. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including a comment and a time stamp corresponding to the time the user checked in may be displayed to other users.

For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention. The check-in activity may also be displayed on a user profile page and in news feeds provided to users of the social networking system.

Still further, a special purpose client application hosted on a mobile device of a user may be configured to periodically capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

FIG. 1 illustrates an example social networking system. In particular embodiments, the social networking system may store user profile data and social graph information in user profile database 101. In particular embodiments, the social networking system may store user event data and calendar data in event database 102. In particular embodiments, the social networking system may store user privacy policy data in privacy policy database 103. In particular embodiments, the social networking system may store geographic and location data in location database 104. In particular embodiments, the social networking system may store media data (e.g., photos, or video clips) in media database 105. In particular embodiments, databases 101, 102, 103, 104, 105, and 110 may be operably connected to the social networking system's front end 120. In particular embodiments, the front end 120 may interact with client device 122 through network cloud 121. Client device 122 is generally a computer or computing device including functionality for communicating over a computer network(e.g., remotely). Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, user profile database 101 may store communication channel information and an address book of a user. The address book, in one implementation, may be a superset or a subset of the users of the social networking system that a user has established a friend or contact relationship. A user of client device 122 may access this address book information using a special purpose or general purpose client application to view contact information. In particular embodiments, the address book may contain one or more contacts (e.g. a person or an business entity), and a name (e.g., first name, and/or last name) and communication channel information for each contact (e.g., a phone number, a user ID for an IM service, an email address, a user ID for a social networking system, home address, etc.). For at least a portion of the address book information, the contact entries may be dynamic in that the contact entry is associated with a user of the social networking system that maintains his or her own account and corresponding user profile with contact information. Accordingly, when a first user changes any aspect of contact information, the revised contact information may be provided to requesting users. In particular embodiments, a user may access the address book, look up and connect to a contact through a communication channel. In some implementations, the client device 122 may maintain a local copy of the address book that may be refreshed or synchronized at various times.

In particular embodiments, event database 102 may store event data for any number of particular events and the data associated with each event including the name of the event, the date and time of the event, the event location, particular users who are invited to participate or who are participating in the event, and other user or participant's comments about the event. For example, a user may schedule an event through the social networking system, which has an associated link so that any invited user may participate, or any user if the event is open to any user. The event may have a specific geographical location associated with the event and other participants who have indicated through the social networking system that they will participate in the event. The event may also have event photos that have been uploaded by the user who created the event or any other participants.

In particular embodiments, privacy policy database 103 may store a user's privacy data for a user's settings for each user datum associated with the user and the user's settings for third party applications. For example, a user may have selected default privacy settings or a user may have specifically excluded certain entities from viewing a user datum or particular type of user data, and all of that privacy data for all users and friends of users may be stored in the privacy policy database 103.

In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with Wi-Fi and GPS capabilities can be identified by cell tower triangulation, Wi-Fi positioning, and/or GPS positioning. In particular embodiments, location database 104 may store an information base of places, where each place includes a name, a geographic location and meta information. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid (i.e., geometric center) of the shape. For example, meta information of a place can include information identifying be the user that initially created the place, reviews, ratings, comments, check-in activity data, and the like. Places may be created by administrators of the system and/or created by users of the system. For example, a user may register a new place by accessing a client application to define a place name and provide a geographic location and cause the newly created place to be registered in location database 104. The creating user or other users may access a web page directed to the page and add additional information, such as reviews, comments and ratings for the place. In particular embodiments, location database 104 may store a user's location data. For example, location database 104 may store a user's check-in activities. For example, a user can create a place (e.g., a new restaurant or coffee shop), causing the social networking system to stores the user-created place in location database 104. For example, a user can create a comment, a review, or a rating of a place, causing the social networking system to store the user's comment, review and rating of the place in location database 104.

The social networking system may also include media sharing capabilities. In particular embodiments, a user of the social networking system may upload one or more media files to media database 105. For example, a user can upload a photo or a set of photos (often called a photo album), or a video clip to media database 105 from a client device 122 (e.g., a computer, or a camera phone). In particular embodiments, the one or more media files may contain metadata (often called "tags") associated with each media file. For example, a photo shot by a digital camera may contain metadata relating to file size, resolution, time stamp, name of the camera maker, and/or location (e.g., GPS) coordinates. A user can add additional metadata values to a photo, or tag a photo, during an upload process. Some examples of tags of a media file are author, title, comments, event names, time, location, names of people appearing in the media file, or user comment. In particular embodiments, a user may tag a media file by using a client application (e.g., a photo or video editor), or entering one or more tags in a graphical user interface of a media uploading tool that uploads a user's one or more media files from a client device 122 to the social networking system. A user may also tag a media file after an upload at a later time in the social networking system's web site. In particular embodiments, the social networking system may also extract metadata from a media file and store the metadata in media database 105.

In particular embodiments, news feed engine 110 may access user profile database 101, event database 102, location database 104 and media database 105 for data about a user or set of users of the social networking system, and assemble a list of one or more activities as news items for a particular user. In particular embodiments, news feed engine 110 may access privacy policy database 103 and determine a subset of news items based on one or more privacy settings. In particular embodiments, news feed engine 110 may compile a dynamic list of a limited number of news items in a ranked or sorted order. In particular embodiments, news feed engine 110 may provide links related to one or more activities in the news items, and links providing opportunities to participate in the activities. For example, a news feed can comprise wall posts, status updates, comments, and recent check-ins to a place (with a link to a web page of the place). In other embodiments, news feed engine 110 may access user profile database 101, event database 102, location database 104 and media database 105 and compile a dynamic list of a limited number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

The social networking system may also support other location-based services, such as location-based search and map services. For example, using client device 122, a user may access the social networking system and retrieve graphical maps that correspond to the user's current location and/or a desired location. In particular embodiments, a user may manually input a location either in a free-form text field and/or in connection with a check-in to a place in a geo-social networking system. Still further, the client device 122 may include GPS or other location functionality that may be appended or otherwise included in one or more messages transmitted to the social networking system. The social networking system itself may host search and map services as internal functionality or may rely on one or more external systems hosted by third party service providers. Using such functionality, a user may transmit a query that identifies a location and, optionally, one or more search terms that correspond to a desired activity or other intention (such as restaurants, shopping, gas stations and the like). A response may include a graphical map indicating the identified location graphically as an icon together with additional icons corresponding to locations that meet the search query.

Figure 2:
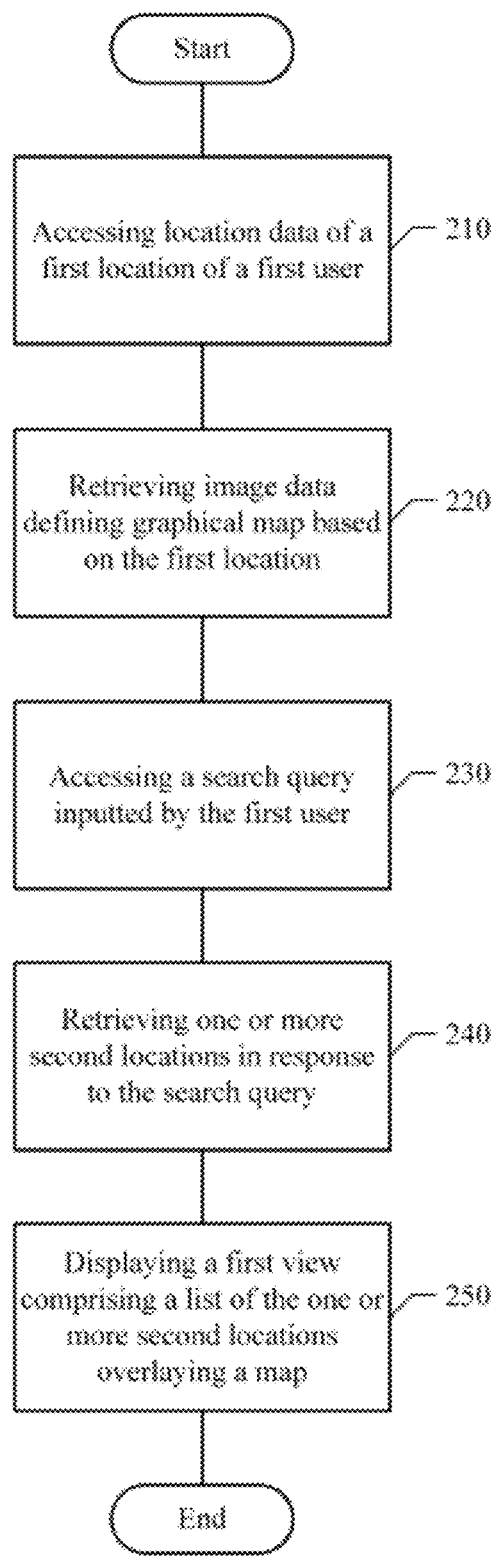
FIG. 2 illustrates an example method.

FIG. 2 illustrates an example method of displaying a graphical user interface for a map search with respect to the location-based services networking system. In particular embodiments, graphical map search data may be displayed in one or more user interfaces, e.g., example user interfaces illustrated in FIG. 3-FIG. 6. The steps in FIG. 2 may be executed by a user interacting with the interface of client device 122. Client device 122 may access the location-based map search services using either a special-purpose client application or a general-purpose browser client.

Particular embodiments may access location data representing a first location of a first user wherein the first location corresponds to geographic coordinates, as illustrated in step 210. The first location may be a current location or previous location of the user or any arbitrary location specified by the user. The first location may be a location identified as the result of a query. Particular embodiments may automatically access GPS data or other geo-location functions to determine a location of the user. Particular embodiments may determine the user's location based on location data from social networking system being continuously received by a special purpose client application that is configured to continuously capture location data of a mobile device of the first user. Particular embodiments may record data, including but not limited to, the latitude and longitude of the user, the altitude of the user, the horizontal and vertical accuracy levels of the location information, the current speed and direction of the user's travel, the timestamp of when a particular location was recorded, and the source of the location data on the mobile device, for example, from a GPS chip, WiFi, Bluetooth hardware, Cellular ID, or a software solution incorporating one or more of the above signals. Particular embodiments may determine the first user's location based on the user's most recent or history of location information, based on the entries above in the geo-social networking system. Particular embodiments may determine the first user's location based on automatic check-in or geo-tracking mechanisms or even the user's latest check-in entry based on the time stamp of the entry maintained by a geo-social networking system. Furthermore, location information may also be included in a search query inputted by the user in a text entry field. For example, a user may input a query "coffee Dolores Park." A search service may parse the query to identify the geographic terms to locate map image data to be displayed to a user.

In particular embodiments, the search query may require disambiguation based on a variety of signals, including but not limited to, the most recent or history of location information for the user stored in the geo-social networking system, recent or historical location information for friends of the user as determined by the geo-social networking system, the currently displayed viewport of the graphical map interface, or location information resident on the mobile device but not yet resident on the geo-social networking system. In particular embodiments, for example, Dolores Park could refer to a park in San Francisco or New York, or two completely different zones. In particular embodiments, which set of results is retrieved could be altered by whether the user is closer to one of the two zones, whether they are normally closer to one of the two zones, whether the user's friends are normally closer to one of the two zones, and whether the phone has received a GPS update saying that the phone is closer to one of the two zones even if the geo-social networking system has not yet been updated.

Figure 3:
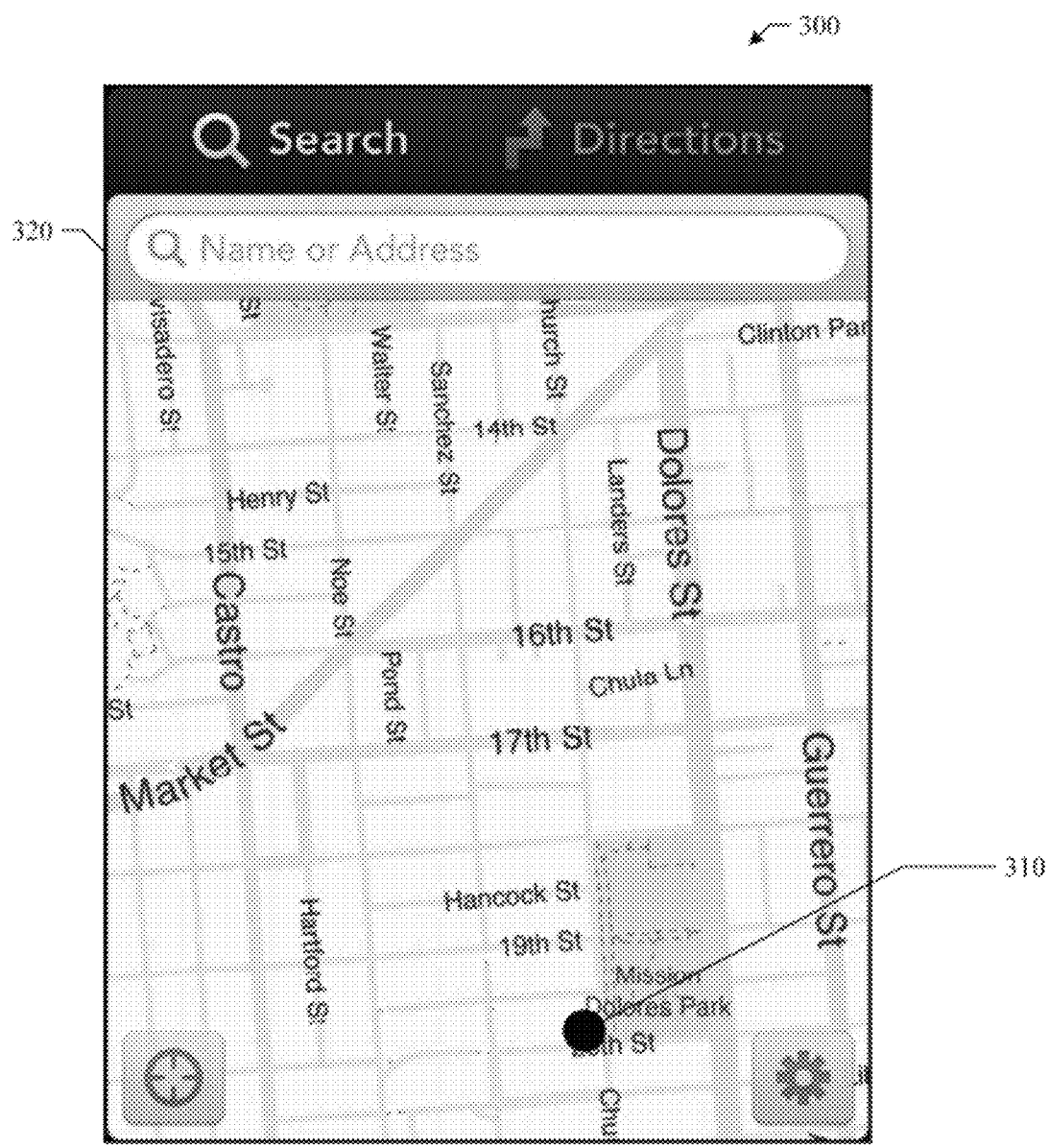
FIG. 3 illustrates an example user interface.

Particular embodiments may retrieve image data defining a graphical map from a remote server based on the first location, as illustrated in step 220. In particular embodiments, image data defining a graphical map may be retrieved from local cache of the client. Image data defining a graphical map may be stored in databases, servers, other types of computing devices, or in the local cache of the client. FIG. 3 illustrates an example user interface where image data defining a graphical map has been retrieved from a remote server based on the first location and is being displayed as a graphical map 300. Within graphical map 300, location data representing a first location of a first user may be displayed as graphical location indicator 310. For example, graphical location indicator 310 representing the current location of the first user may be a blue dot, or any other such graphical indicator that distinctly points out the location of the user.

Particular embodiments may access a search query inputted by the first user, as illustrated in step 230. Particular embodiments of graphical map 300 may have an input field 320 contained in the interface where the user can enter a search query. A search query is a query that a user enters into input field 320 to satisfy his or her informational needs. For example, a user may enter a search query for "coffee" into input field 320.

Particular embodiments may retrieve one or more second locations in response to the search query, where the one or more second locations correspond to geographic coordinates, as illustrated in step 240. Sophisticated search engines implement many other functionalities in addition to merely identifying the second locations as a part of the search process. For example, a search engine may rank the second locations identified for a search query according to their relative degrees of relevance. Relevance may include one or more of a proximity component and one or more social components. For example, relevance of a particular second location may be based in part on the distance between the first location and the second location. In order to determine relevance to the user at the first location, particular embodiments may access the user's social network data. For example, particular embodiments may access data associated the user's prior check-in activity. Particular embodiments may access data associated with the other users who have checked-in, which may include the user's friends or other social contacts of the user who is at the first location. Particular embodiments may access data associated with places that the first user "likes" or additional "like" data from any other users including, but not limited to, the user's friends or other social contacts of the user. In particular embodiments, the first user or any other user may have "liked" any of one or more second location one or more times. Further, particular embodiments may access external data, such as third-party ratings and reviews.

In particular embodiments, a search engine may rank the second locations identified for a search query by relevance and relative to the user's location so that second locations in closer proximity to the user are ranked higher than those second locations that are a greater distance from the user. In order to determine the relevance and proximity, particular embodiments may access the social network data discussed above as well as location data of the user that was accessed in step 210.

Figure 4:
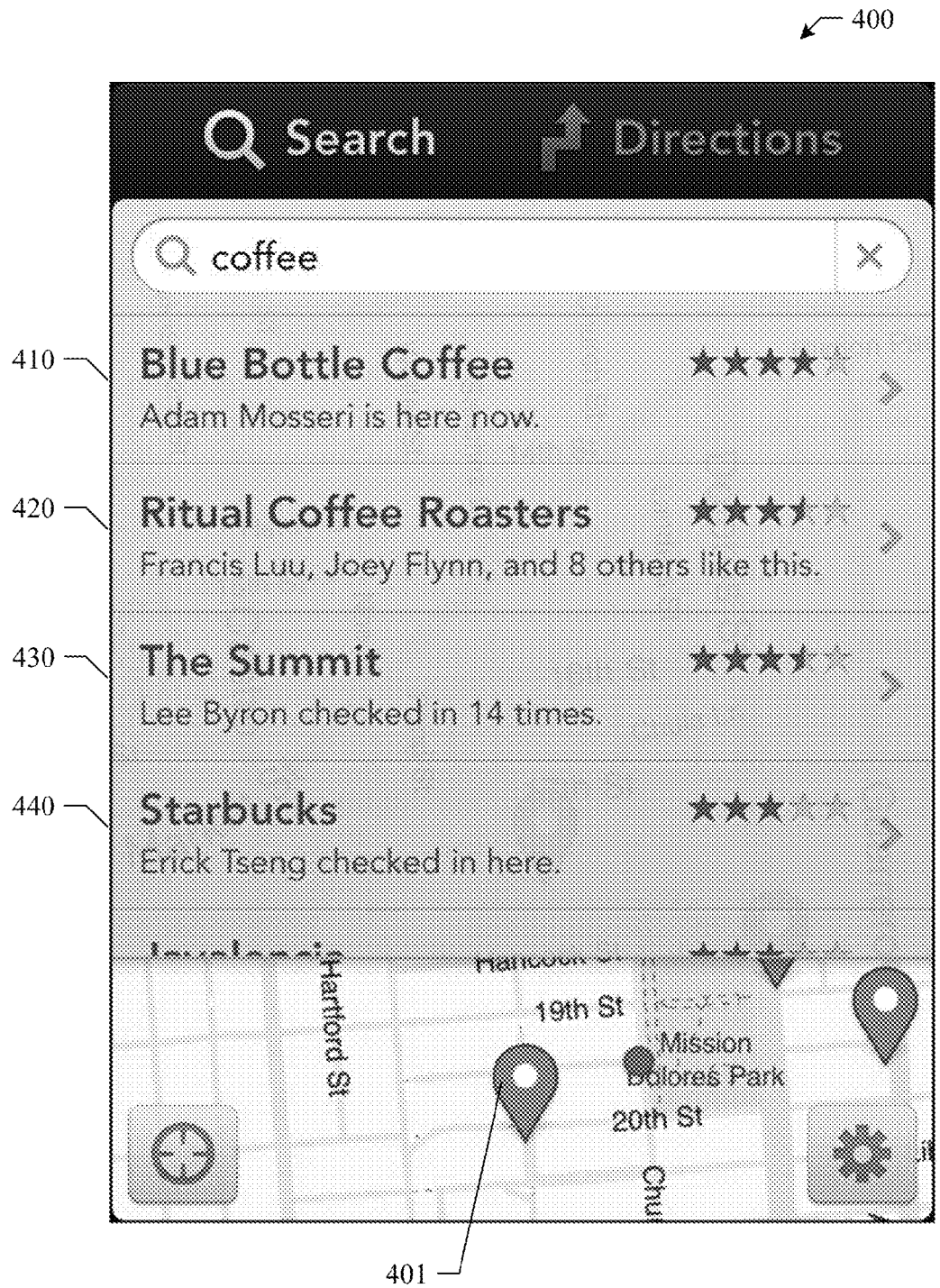
FIG. 4 illustrates a second example user interface.

Particular embodiments may display a first view comprising a list of the one or more second locations overlaying at least a portion of the graphical map, wherein the graphical map includes indicators for the first location and at least one of the one or more second locations in accordance with their respective geographic coordinates, as illustrated in step 250. In particular embodiments, the list of one or more second locations overlaying at least a portion of the graphical map is translucent, enabling the graphical map to be at least slightly visible through the list. FIG. 4 illustrates an example search result 400 that identifies four second locations 410, 420, 430, 440. Search result 400 is generated in response to an example search query "coffee". Note that only four second locations are illustrated in order to simplify the discussion. In practice, a search result may identify tens, hundreds, or even thousands of locations near or around the first user. Still further, the overlay list view may be scrollable to allow additional locations to be displayed. Second locations 410, 420, 430, 440, each may include a title for the location, a short summary, including relevant social data retrieved from social networking system, and a rating for the particular second location.

In particular embodiments, second locations 410, 420, 430, 440, may be presented according to their relative degrees of relevance to search query "coffee". That is, second location 410 may be considered somewhat more relevant to search query "coffee" than second location 420, which, in turn, may be considered somewhat more relevant than second location 430, and so on. Consequently, second location 410 may be presented first (i.e., at the top of search result 400) followed by second location 420, second location 430, and so on. In particular embodiments, second locations 410, 420, 430, 440 may be presented in a list view on top of the map that obscures at least a portion of the map. In some embodiments, the graphical map icon or location indicator corresponding to the first-ranked location may be centered in the portion of the display map that remains unobscured by the list view. Furthermore, the client application may move the displayed portion of the map such that another icon corresponding to a location in the list view is substantially centered in the unobscured portion in response to selection inputs by the user. For example, positional indicator 401 may correspond to second location 410. In other particular embodiments, in response to selection inputs by the user, the client application may collapse the list view such that the map is completely unobscured by the list and re-enable the list view, which may again obscure at least a portion of the map.

In particular embodiments, 410, 420, 430, 440, may be presented according to their relative degrees of relevance to search query "coffee" in or around the user's location. That is, second location 410 may be considered somewhat more relevant to search query "coffee" and closer in proximity to the user's current location than second location 420. Second location 420, in turn, is considered somewhat more relevant and close in proximity to the user's location than second location 430, and so on. Consequently, second location 410 may be presented first (i.e., at the top of search result 400) followed by second location 420, second location 430, and so on.

In particular embodiments, the ranking of the second locations with respect to the search queries may be determined by a ranking algorithm implemented by the search engine. Given a search query and a set of second locations identified in response to the search query, the ranking algorithm ranks the second locations in the set according to their relative degrees of relevance with respect to the search query or by proximity to the first user. More specifically, in particular embodiments, the second locations that are relatively more relevant to the search query are ranked higher than the second locations that are relatively less relevant to the search query, as illustrated, for example, in FIG. 4.

As discussed above, second locations 410, 420, 430, 440 may also be represented as corresponding positional indicators in the graphical map portion of the user interface. Each positional indicator appearing on the graphical map portion of the user interface may represent a corresponding second location 410, 420, 430, 440, and appear at the geographical coordinates for the location associated with second locations 410, 420, 430, 440. As discussed below, a list view may be displayed as an overlay on the graphical map that can be toggled on and off by the user. Furthermore, a user using appropriate inputs (such as touch screen inputs) may cause the client application (with the overlay list toggled on or off) to pan the graphical map as desired by the user.

In particular embodiments, each second location 410, 420, 430, and 440 is selectable both in the overlaying list view and the graphical map. Particular embodiments may, in response to input by the first user, display a second view comprising the list of the one or more second locations overlaying the graphical map, wherein one of the one or more second locations is highlighted and the portion of the displayed may that is unobscured by the overlaying list view is centered on the geographic coordinates of the highlighted second location. For example, in particular embodiments, if the user selects a second location 410, 420, 430, 440 from the list view, the second location may become highlighted and the graphical map may center on the positional icon representing the geographic coordinates for the selected second location. Further, in response to input by the first user from the graphical map view, particular embodiments may display a third view comprising the list of the one or more second locations overlaying the graphical map, wherein one of the one or more second locations is highlighted and the unobscured (in one implementation, lower) portion of the map is centered and zoomed in on the geographic coordinates of the highlighted second location. In other implementations, in particular embodiments, if the user selects a second location 410, 420, 430, 440 (either the from the list or the graphical map), the second location may become highlighted and the graphical map may center relative to the overall graphical map (including the obscured portion) and zoom in on the positional icon representing the geographic coordinates for the selected second location.

Figure 5:
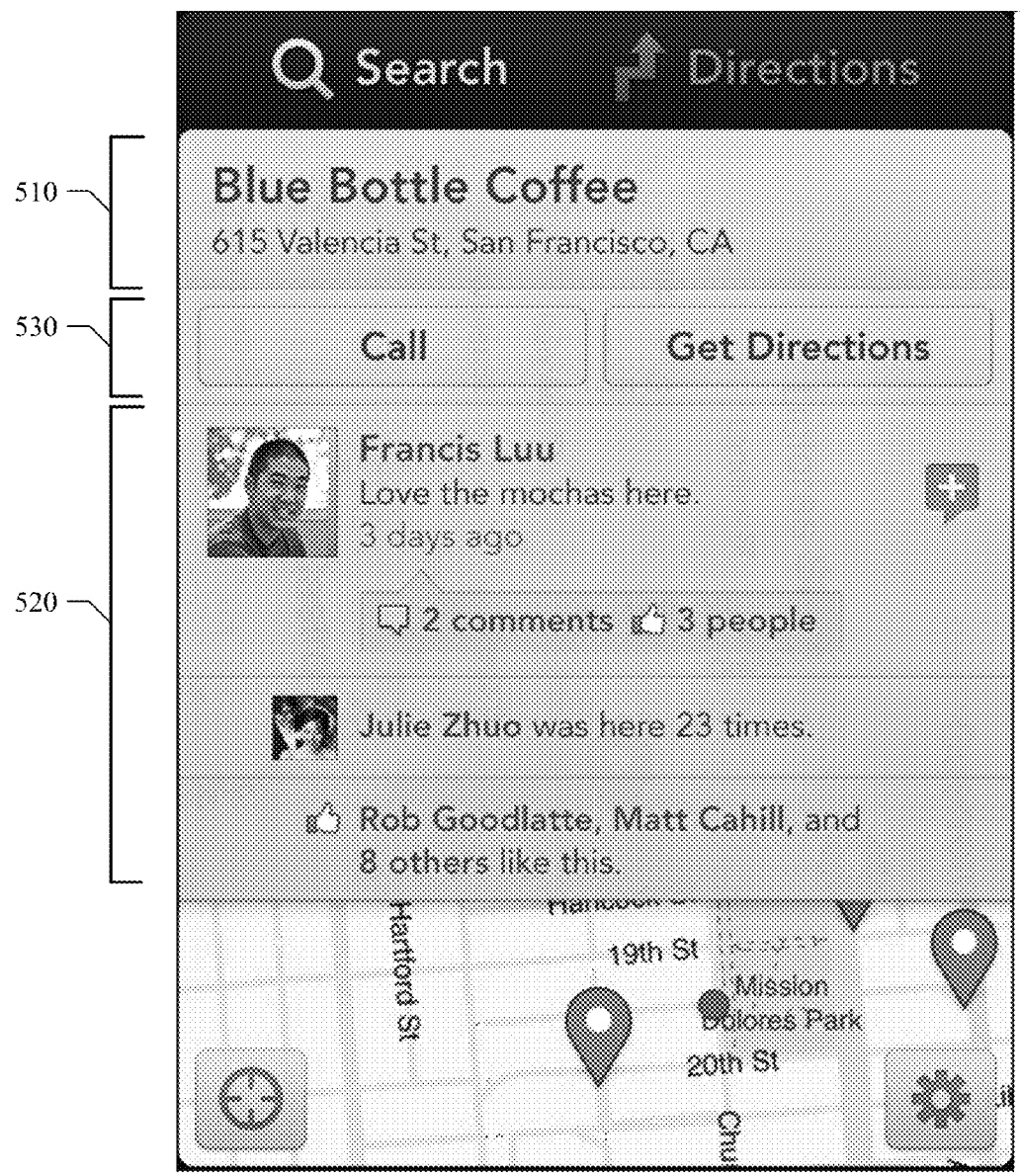
FIG. 5 illustrates a third example user interface.

In particular embodiments, in response to input by the first user associated with a particular second location 410, 420, 430, 440, a client application may display further information about the selected second location, as illustrated in FIG. 5. FIG. 5 illustrates a user interface where in response to input by the user, meta-information is displayed for a second location in user interface 500. For example, the user has selected second location 410, or "Blue Bottle Coffee". User interface 500 is partitioned into several areas or components. In particular embodiments, one or more components in user interface 500, e.g., component 510, may be used to display relevant location data about the selected second location 410. For example, component 510 may display the geographical coordinates, address, phone number, or business hours for the selected second location 410. In particular embodiments, additional components, such as component 520, may be used to display social network data retrieved from social networking system that relates to selected second location 410. For example, component 520 may display social network data such as friends or other associates of the user who have checked-in at Blue Bottle Coffee, commented on Blue Bottle Coffee, indicated that they "like" Blue Bottle Coffee, or any other social network data available in the database. In particular embodiments, additional components, such as component 530, may be used to display selectable components where the component displays additional information or performs additional functions in response to user input. For example, the user may select component 530 to call Blue Bottle Coffee or get directions to Blue Bottle Coffee.

Figure 6:
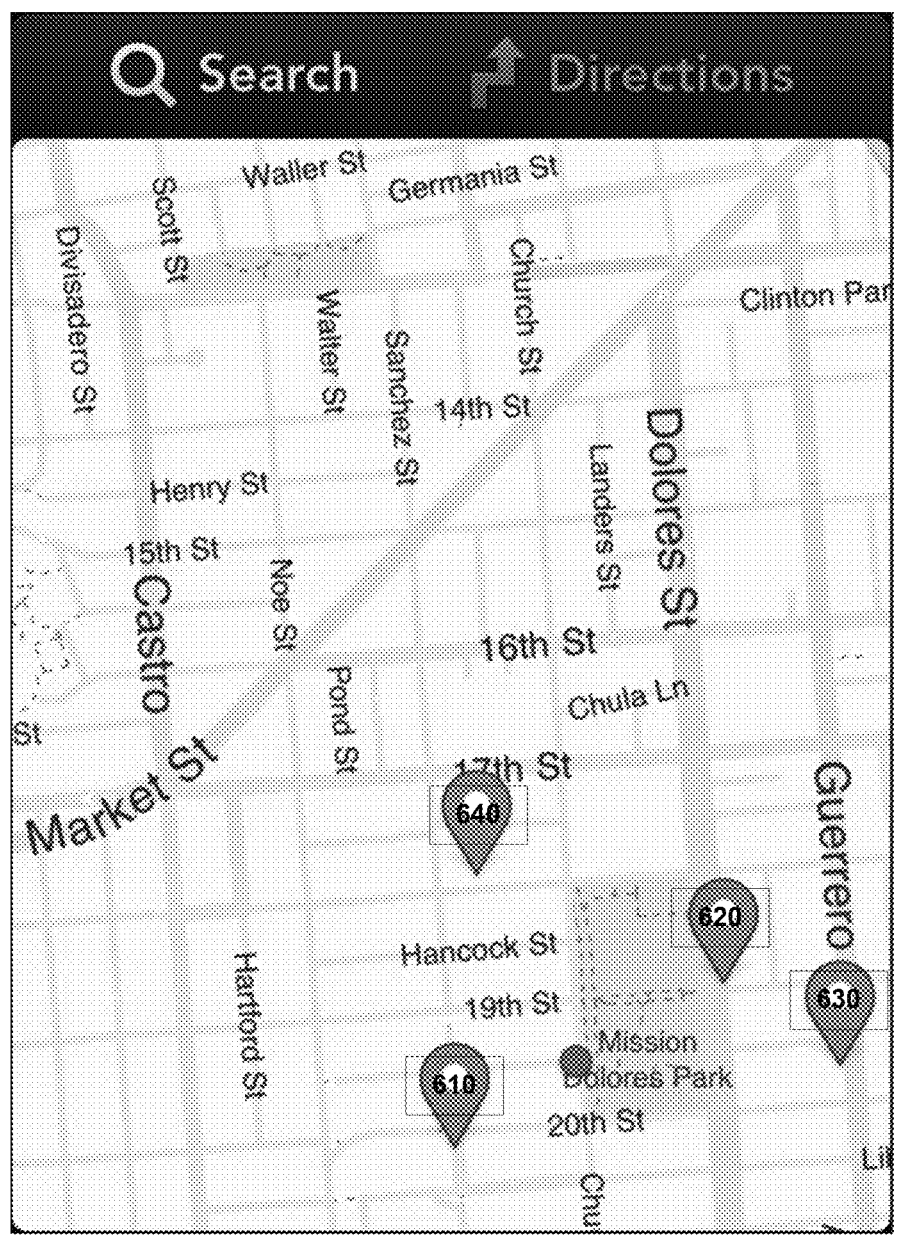
FIG. 6 illustrates a fourth example user interface.

In particular embodiments, in response to input by a user, second locations 410, 420, 430, 440 may be presented only as positional indicators on the graphical map 600, as illustrated in FIG. 6. Particular embodiments of graphical map 600 may pan or zoom in and out in response to input by a user. Graphical map 600 may display positional indicators for the second locations where each positional indicator 610, 620, 630, 640 corresponds to a second location 410, 420, 430, 440 discussed above. Positional indicators 610, 620, 630, 640 are positioned on the graphical map at the geographical coordinates for the location associated the respective second location. Further, in response to input by a user, each positional indicator 610, 620, 630, 640 is selectable and may display further information about each of the second locations 410, 420, 430, 440 in the same manner as described above in connection with FIG. 5. For example, from the user interface illustrated in FIG. 6, a user may select a given positional indicator (e.g., positional indicator 620), causing the client application to display an interface similar to FIG. 5, where the positional indicator 620 is centered in the unobscured portion of the map display and the overlay includes meta-information associated with the selected second location.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 7:
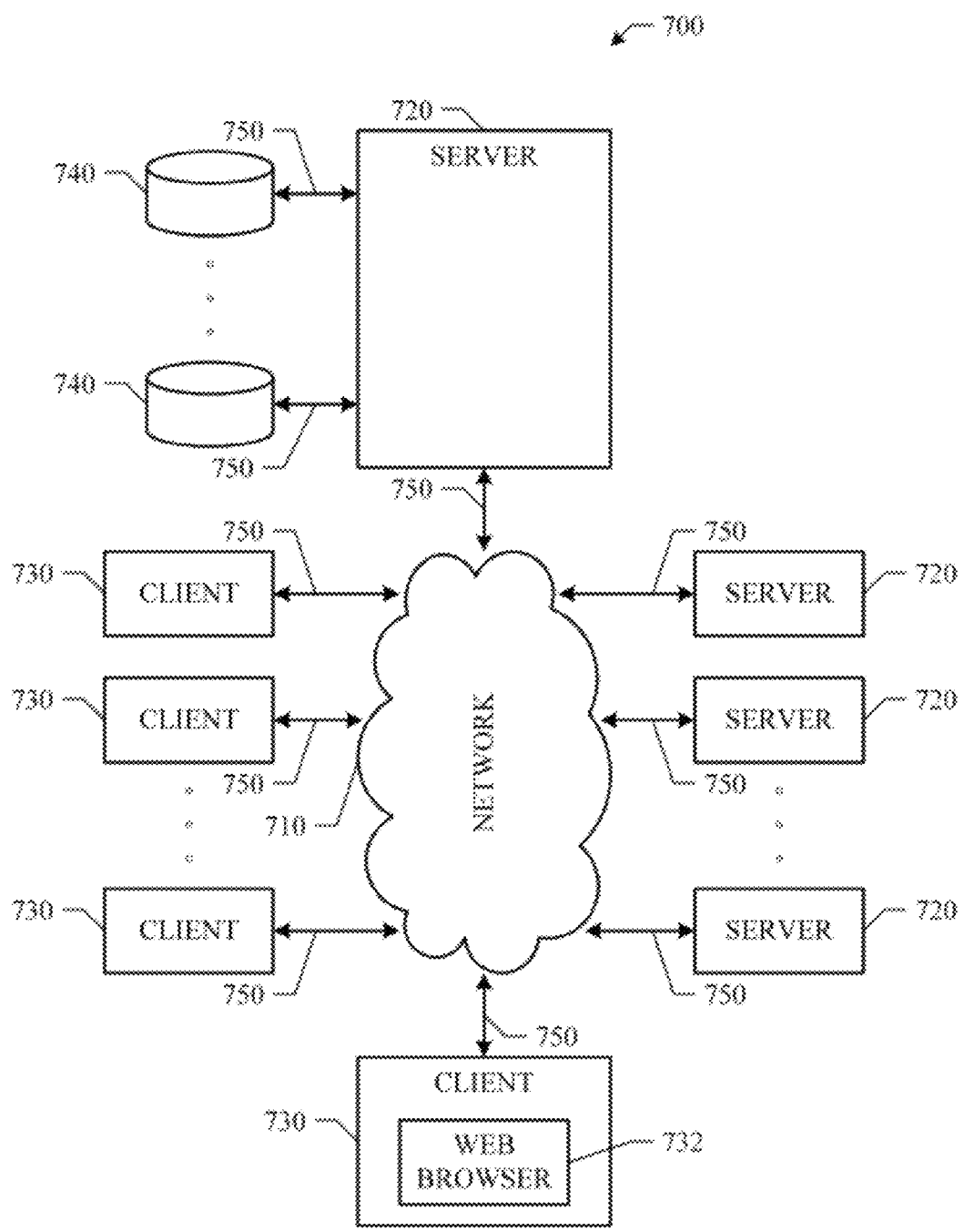
FIG. 7 illustrates an example network environment.

Particular embodiments may be implemented in a network environment. FIG. 7 illustrates an example network environment 700 suitable for providing software validation as a service. Network environment 700 includes a network 710 coupling one or more servers 720 and one or more clients 730 to each other. In particular embodiments, network 710 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 710 or a combination of two or more such networks 710. The present disclosure contemplates any suitable network 710.

One or more links 750 couple a server 720 or a client 730 to network 710. In particular embodiments, one or more links 750 each includes one or more wireline, wireless, or optical links 750. In particular embodiments, one or more links 750 each includes an intranet, an extranet, a VPN, a LAN, a WLAN, a WAN, a MAN, a communications network, a satellite network, a portion of the Internet, or another link 750 or a combination of two or more such links 750. The present disclosure contemplates any suitable links 750 coupling servers 720 and clients 730 to network 710.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores.

In particular embodiments, a server 720 may also include a data monitor/collector 724. Data monitor/collection 724 may include hardware, software, or embedded logic components or a combination of two or more such components for carrying out the appropriate functionalities implemented or supported by data collector/collector 724. For example and without limitation, data monitor/collector 724 may monitor and collect network traffic data at server 720 and store the collected network traffic data in one or more data storage 740. The pairs of search query and clicked URL may then be extracted from the network traffic data.

In particular embodiments, a server 720 may include a search engine 722. Search engine 722 may include hardware, software, or embedded logic components or a combination of two or more such components for carrying out the appropriate functionalities implemented or supported by search engine 722. For example and without limitation, search engine 722 may implement one or more search algorithms that may be used to identify network resources in response to the search queries received at search engine 722, one or more ranking algorithms that may be used to rank the identified network resources, one or more summarization algorithms that may be used to summarize the identified network resources, and so on. The ranking algorithms implemented by search engine 722 may be trained using the set of the training data constructed from pairs of search query and clicked URL.

In particular embodiments, one or more data storages 740 may be communicatively linked to one or more servers 720 via one or more links 750. In particular embodiments, data storages 740 may be used to store various types of information. In particular embodiments, the information stored in data storages 740 may be organized according to specific data structures. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functionalities implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 8:
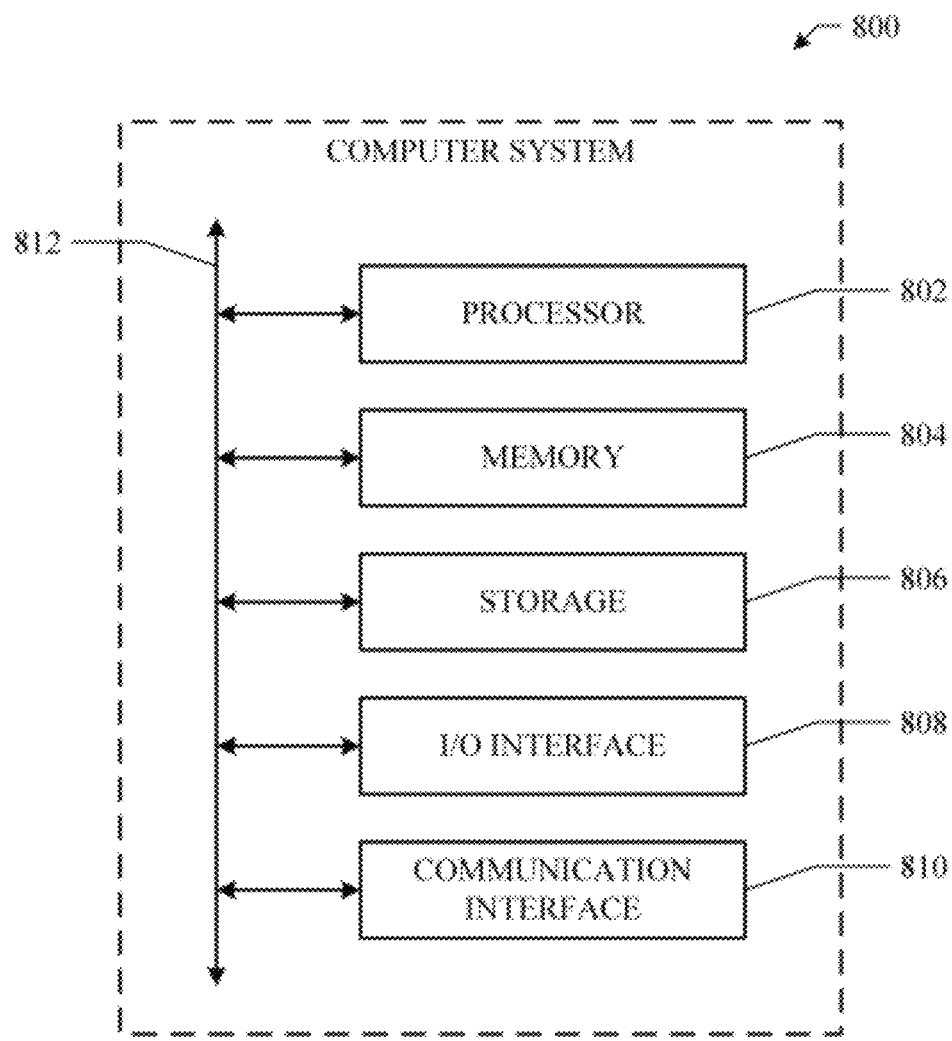
FIG. 8 illustrates an example computer system.

A client 730 may have a search engine. A search engine is a computer-implemented tool designed to search for information relevant to specific subject matters or topics on a network, such as the Internet, the World Wide Web, or an Intranet. To conduct a search, a network user may issue a search query to the search engine. The search query generally contains one or more words that describe a subject matter. In response, the search engine may identify one or more network resources that are likely to be related to the search query, which may collectively be referred to as a "search result" identified for the search query. The network resources are usually ranked and presented to the network user according to their relative degrees of relevance to the search query Particular embodiments may be implemented on one or more computer systems. FIG. 8 illustrates an example computer system 800 that may be used to implement a server. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. The present disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. The present disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 9:
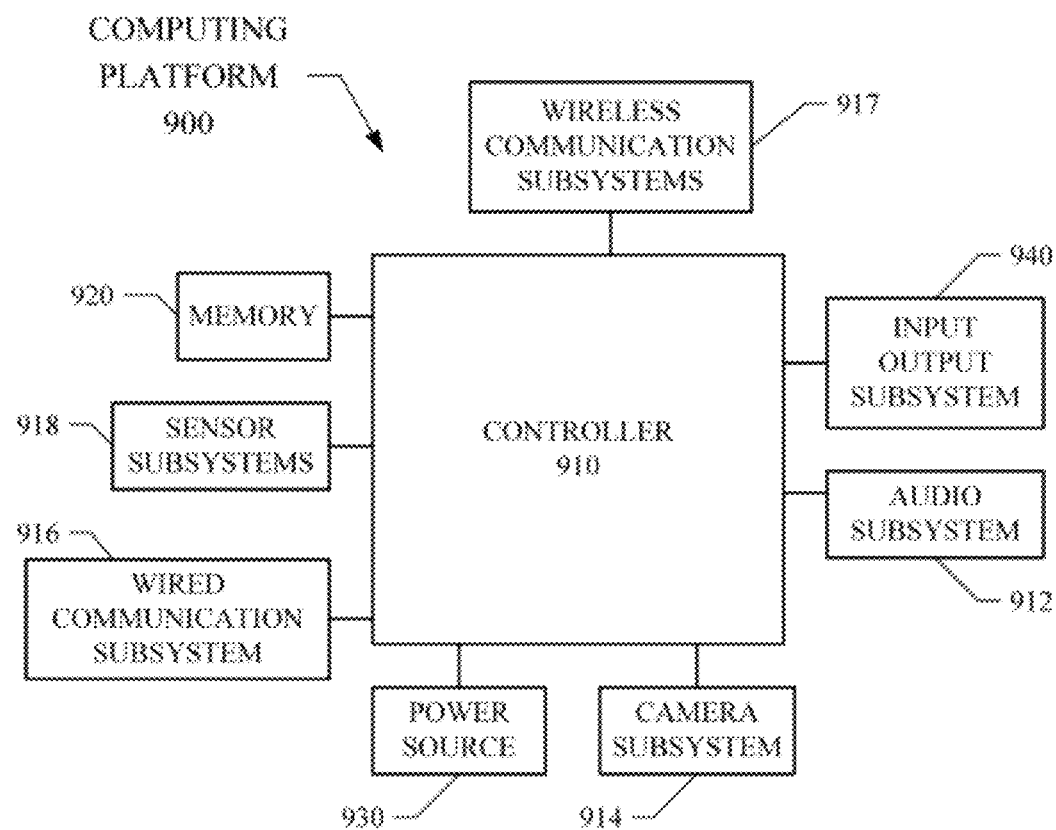
FIG. 9 illustrates an example mobile computing platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 9 illustrates a schematic representation of the main components of an example computing platform of a client or mobile device, according to various particular embodiments. In particular embodiments, computing platform 900 may comprise controller 910, memory 920, power source 930, and input output subsystem 940. In particular embodiments, controller 910 which may comprise one or more processors and/or one or more microcontrollers configured to execute instructions and to carry out operations associated with a computing platform. In various embodiments, controller 910 may be implemented as a single-chip, multiple chips and/or other electrical components including one or more integrated circuits and printed circuit boards. Controller 910 may optionally contain a cache memory unit for temporary local storage of instructions, data, or computer addresses. By way of example, using instructions retrieved from memory, controller 910 may control the reception and manipulation of input and output data between components of computing platform 900. By way of example, controller 910 may include one or more processors or one or more controllers dedicated for certain processing tasks of computing platform 900, for example, for 2D/3D graphics processing, image processing, or video processing.

Controller 910 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 920 that is operatively coupled to controller 910.

Memory 920 may encompass one or more storage media and generally provide a place to store computer code (e.g., software and/or firmware) and data that are used by computing platform 900. By way of example, memory 920 may include various tangible computer-readable storage media including Read-Only Memory (ROM) and/or Random-Access Memory (RAM). As is well known in the art, ROM acts to transfer data and instructions uni-directionally to controller 910, and RAM is used typically to transfer data and instructions in a bi-directional manner. Memory 920 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 910. Information may also reside on one or more removable storage media loaded into or installed in computing platform 900 when needed. By way of example, any of a number of suitable memory cards (e.g., SD cards) may be loaded into computing platform 900 on a temporary or permanent basis.

Input output subsystem 940 may comprise one or more input and output devices operably connected to controller 910. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 900. The display is generally configured to display a graphical user interface (GUI) that provides an easy to use visual interface between a user of the computing platform 900 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 910 may also include touch based devices such as touch pad and touch screen. A touchpad is an input device including a surface that detects touch-based inputs of users. Similarly, a touch screen is a display that detects the presence and location of user touch inputs. Input output system 910 may also include dual touch or multi-touch displays or touch pads that can identify the presence, location and movement of more than one touch inputs, such as two or three finger touches.

In particular embodiments, computing platform 900 may additionally comprise audio subsystem 912, camera subsystem 914, wired communication subsystem 916, wireless communication subsystem 917, and sensor subsystems 918, operably connected to controller 910 to facilitate various functions of computing platform 900. For example, Audio subsystem 912, including a speaker, a microphone, and a codec module configured to process audio signals, can be utilized to facilitate voice-enabled functions, such as voice recognition, voice replication, digital recording, and telephony functions. For example, camera subsystem 914, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 920 can include a Universal Serial Bus (USB) port for file transferring, or a Ethernet port for connection to a local area network (LAN).

Wireless communication subsystem 917 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 916 may include hosting protocols such that computing platform 900 may be configured as a base station for other wireless devices.

Sensor subsystem 918 may include one or more sensor devices to provide additional input and facilitate multiple functionalities of computing platform 900. For example, sensor subsystems 918 may include GPS sensor for location positioning, altimeter for altitude positioning, motion sensor for determining orientation of a mobile device, light sensor for photographing function with camera subsystem 914, temperature sensor for measuring ambient temperature, and/or biometric sensor for security application (e.g., fingerprint reader).

In particular embodiments, various components of computing platform 900 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    accessing, by a computing device, location data representing a first location of a first user wherein the first location corresponds to geographic coordinates;
    retrieving, from a remote server, image data defining a graphical map based on the first location;
    accessing a search query inputted by the first user;
    retrieving, by one or more computing devices, a plurality of second locations in response to the search query, wherein each of the second locations corresponds to respective geographic coordinates and one or more entities;
    retrieving, by one or more computing devices, data from a social graph comprising nodes corresponding to a plurality of users of a social-networking system and a plurality of the second locations; and
    providing for display, by one or more computing devices, a first view comprising:
        a list of a plurality of the second locations, wherein:
            the list overlays at least a portion of the graphical map and is ordered based at least on a relevancy to the search query; and
            for each of a plurality of the listed second locations, at least a portion of the data from the social graph that corresponds to the respective listed second location and one or more of the users of the social-networking system is presented; and
        a presentation of the graphical map comprising indicators for the first location and at least one of the listed second locations in accordance with their respective geographic coordinates.

2. The method of claim 1, further comprising:
    in response to input by the first user, providing for display, by one or more computing devices, a second view comprising the list overlaying the graphical map, wherein one of the listed second locations is highlighted and the map is centered on the geographic coordinates of the highlighted second location.

3. The method of claim 2, wherein the one of the listed second locations is centered in a portion of the graphical map unobscured by the list.

4. The method of claim 1, further comprising:
    in response to input by the first user, providing for display, by one or more computing devices, a third view comprising:
        the list overlaying the map, wherein one of the listed second locations is highlighted and the map is centered and zoomed in on the geographic coordinates of the highlighted second location.

5. The method of claim 1, wherein the listed second locations are ordered based at least on a proximity to the first location, in addition to the relevancy to the search query.

6. The method of claim 1, wherein the data from the social graph comprises recent check-in activity associated with one or more social-network contacts of the first user.

7. A system comprising:
    one or more processors; and
    a memory coupled to the processors comprising instructions executable by the processors, the processors being operable when executing the instructions to:
        access location data representing a first location of a first user wherein the first location corresponds to geographic coordinates;
        retrieve, from a remote server, image data defining a graphical map based on the first location;
        access a search query inputted by the first user;
        retrieve a plurality of second locations in response to the search query, wherein each of the second locations corresponds to respective geographic coordinates and one or more entities;
        retrieve data from a social graph comprising nodes corresponding to a plurality of users of a social-networking system and a plurality of the second locations; and
        provide for display a first view comprising:
            a list of a plurality of the second locations, wherein:
                the list overlays at least a portion of the graphical map and is ordered based at least on a relevancy to the search query; and
                for each of a plurality of the listed second locations, at least a portion of the data from the social graph that corresponds to the respective listed second location and one or more of the users of the social-networking system is presented; and
            a presentation of the graphical map comprising indicators for the first location and at least one of the listed second locations in accordance with their respective geographic coordinates.

8. The system of claim 7, wherein the processors are further operable when executing the instructions to:
    in response to input by the first user, provide for display a second view comprising the list overlaying the graphical map, wherein one of the listed second locations is highlighted and the map is centered on the geographic coordinates of the highlighted second location.

9. The system of claim 8 wherein the one of the listed second locations is centered in a portion of the graphical map unobscured by the list.

10. The system of claim 7, wherein the processors are further operable when executing the instructions to:
    in response to input by the first user, provide for display a third view comprising:
        the list overlaying the map, wherein one of the listed second locations is highlighted and the map is centered and zoomed in on the geographic coordinates of the highlighted second location.

11. The system of claim 7, wherein the listed second locations are ordered based at least on a proximity to the first location, in addition to the relevancy to the search query.

12. The system of claim 7, wherein the data from the social graph comprises recent check-in activity associated with one or more social-network contacts of the first user.

13. One or more computer-readable non-transitory storage media embodying software that is operable when executed to:
    access location data representing a first location of a first user wherein the first location corresponds to geographic coordinates;

retrieve, from a remote server, image data defining a graphical map based on the first location;

access a search query inputted by the first user;

retrieve a plurality of second locations in response to the search query, wherein each of the second locations corresponds to respective geographic coordinates and one or more entities;

retrieve data from a social graph comprising nodes corresponding to a plurality of users of a social-networking system and a plurality of the second locations; and provide for display a first view comprising:

a list of a plurality of the second locations, wherein:

the list overlays at least a portion of the graphical map and is ordered based at least on a relevancy to the search query; and for each of a plurality of the listed second locations, at least a portion of the data from the social graph that corresponds to the respective listed second location and one or more of the users of the social-networking system is presented; and a presentation of the graphical map comprising indicators for the first location and at least one of the listed second locations in accordance with their respective geographic coordinates.

14. The media of claim 13, wherein the software is further operable when executed to:

in response to input by the first user, provide for display a second view comprising the list overlaying the graphical map, wherein one of the listed second locations is highlighted and the map is centered on the geographic coordinates of the highlighted second location.

15. The media of claim 14 wherein the one of the listed second locations is centered in a portion of the graphical map unobscured by the list.

16. The media of claim 13, wherein the software is further operable when executed to:

in response to input by the first user, provide for display a third view comprising:

the list overlaying the map, wherein one of the listed second locations is highlighted and the map is centered and zoomed in on the geographic coordinates of the highlighted second location.

17. The media of claim 13, wherein the listed second locations are ordered based at least on a proximity to the first location, in addition to the relevancy to the search query.

18. The media of claim 13 wherein the data from the social graph comprises recent check-in activity associated with one or more social-network contacts of the first user.

* * * * *